(12) United States Patent
Hoang et al.

(10) Patent No.: US 11,351,492 B2
(45) Date of Patent: Jun. 7, 2022

(54) INLINE VORTEX DEMISTER

(71) Applicant: B/E Aerospace, Inc., Winston Salem, NC (US)

(72) Inventors: Thao Hoang, Arlington, WA (US); Yen Chuh, Irvine, CA (US); Logan J. Butler, Everett, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 359 days.

(21) Appl. No.: 16/280,700

(22) Filed: Feb. 20, 2019

(65) Prior Publication Data

US 2021/0138378 A1 May 13, 2021

(51) Int. Cl.
| | |
|---|---|
| *B01D 45/12* | (2006.01) |
| *B01D 45/14* | (2006.01) |
| *B04C 5/15* | (2006.01) |
| *B04C 9/00* | (2006.01) |
| *B64D 11/02* | (2006.01) |

(Continued)

(52) U.S. Cl.
CPC ............... *B01D 45/14* (2013.01); *B04C 5/15* (2013.01); *B04C 9/00* (2013.01); *B04C 2009/004* (2013.01); *B64D 11/02* (2013.01); *C02F 1/38* (2013.01); *E03F 1/006* (2013.01)

(58) Field of Classification Search
CPC . B01D 45/14; E03F 1/006; C02F 1/38; B64D 11/02; B04C 9/00; B04C 5/15; B04C 2009/004
See application file for complete search history.

(56) References Cited

U.S. PATENT DOCUMENTS

| | | | | |
|---|---|---|---|---|
| 1,795,888 A | * | 3/1931 | Rabezzana | B01D 45/14 55/394 |
| 2,793,847 A | * | 5/1957 | Steele | B01D 45/14 261/89 |

(Continued)

FOREIGN PATENT DOCUMENTS

| | | |
|---|---|---|
| EP | 1205251 A1 | 5/2002 |
| EP | 3388133 A4 | 8/2019 |

(Continued)

OTHER PUBLICATIONS

Sasaki Takahide, Gas-Liquid Separator, (Machine translation obtained from JPO and INPIT Jul. 2021) (Year: 2005).*

(Continued)

*Primary Examiner* — Dung H Bui
(74) *Attorney, Agent, or Firm* — Suiter Swantz pc llo

(57) ABSTRACT

An inline vortex demister for removing moisture from an air stream is disclosed. In embodiments, the inline vortex demister includes one or more vortex-inducing structures disposed within a tube. In embodiments, the one or more vortex-inducing structures are configured to induce an air stream with a first moisture content into a vortex flow pattern in order to remove a first volume of moisture from the air stream by causing the first volume of moisture to adsorb to an inner tube surface of the tube. In additional embodiments, the inline vortex demister includes a demister element disposed within the tube, wherein the demister element is configured to remove a second volume of moisture from the air stream.

14 Claims, 9 Drawing Sheets

(51) Int. Cl.
*C02F 1/38* (2006.01)
*E03F 1/00* (2006.01)

(56) References Cited

U.S. PATENT DOCUMENTS

| | | | | |
|---|---|---|---|---|
| 3,813,854 A | * | 6/1974 | Hortman | B04C 3/00 |
| | | | | 55/399 |
| 6,453,481 B1 | | 9/2002 | Pondelick et al. | |
| 6,468,426 B1 | | 10/2002 | Klass | |
| 6,540,917 B1 | * | 4/2003 | Rachels | B04C 3/00 |
| | | | | 210/512.1 |
| 7,722,693 B2 | * | 5/2010 | Yoo | A47L 9/1666 |
| | | | | 55/345 |
| 7,998,250 B2 | | 8/2011 | Pondelick et al. | |
| 7,998,251 B2 | | 8/2011 | Pondelick et al. | |
| 8,291,525 B2 | | 10/2012 | Pondelick et al. | |
| 8,607,370 B2 | | 12/2013 | Hoang et al. | |
| 2007/0234691 A1 | * | 10/2007 | Han | B04C 5/06 |
| | | | | 55/457 |
| 2008/0006011 A1 | | 1/2008 | Larnholm et al. | |
| 2008/0028940 A1 | * | 2/2008 | Han | B04C 5/28 |
| | | | | 96/417 |
| 2009/0065431 A1 | | 3/2009 | Bakke et al. | |
| 2009/0084714 A1 | | 4/2009 | Schook | |
| 2009/0113859 A1 | * | 5/2009 | Oh | A47L 9/1641 |
| | | | | 55/337 |
| 2009/0288560 A1 | * | 11/2009 | Ruppel | F01M 13/04 |
| | | | | 96/408 |
| 2010/0084352 A1 | * | 4/2010 | Pondelick | B64D 11/02 |
| | | | | 210/788 |
| 2013/0145732 A1 | * | 6/2013 | Gwynn | B04C 5/15 |
| | | | | 55/283 |
| 2013/0318933 A1 | * | 12/2013 | Ciccarelli | B04C 3/00 |
| | | | | 55/337 |
| 2016/0123227 A1 | * | 5/2016 | Murray | F02C 7/052 |
| | | | | 55/337 |
| 2016/0206169 A1 | * | 7/2016 | Hyun | A47L 9/1633 |
| 2017/0296017 A1 | * | 10/2017 | Hyun | B04C 7/00 |
| 2017/0297038 A1 | * | 10/2017 | King | B01D 21/267 |
| 2017/0361338 A1 | * | 12/2017 | Ni | B01D 45/16 |
| 2018/0250620 A1 | * | 9/2018 | Vingelven | B01D 45/16 |
| 2019/0091703 A1 | * | 3/2019 | Hyun | A47L 9/16 |

FOREIGN PATENT DOCUMENTS

| | | | |
|---|---|---|---|
| JP | 2005028309 | * | 2/2005 |
| WO | 2016060648 A1 | | 4/2016 |

OTHER PUBLICATIONS

Extended Search Report for European Application No. 20158325.9 dated Jul. 20, 2020, 10 pages.

* cited by examiner

INLINE VORTEX DEMISTER

BACKGROUND

Some traditional aircraft waste material separation systems employ a vacuum to transport liquid and solid waste material from aircraft toilets or other receptacles to a waste storage tank. The waste material transported to the waste storage tank may include solid human waste, urine, water, cleansing and disinfecting chemicals, food, toilet paper, and the like. Furthermore, waste material transported to the waste storage tank typically includes air. The air drawn along with the waste material to the waste storage tank must be vented and released out to the atmosphere in order to prevent the build-up of gasses and pressure. However, the air from the waste storage tank which is released out of the aircraft to the atmosphere must be cleaned/filtered such that it is free of solid waste and particulate matter, for obvious health and safety concerns. Additionally, moisture within the air released from the aircraft may condense and freeze on the exterior of the aircraft, which may clog the air vent tube or interfere with the operation of the aircraft. Accordingly, the air released out of the aircraft must be filtered in order to ensure a sufficiently low moisture content.

Traditional aircraft waste material separation systems employ moisture separation systems and methods within the waste storage tank to filter moisture from the vented air stream. However, depending on the moisture content of the air stream, traditional moisture separation systems may not be sufficient to adequately filter moisture from the air stream. Furthermore, traditional moisture separation systems are may add excessive weight to the overall weight of the aircraft, and may suffer in that they are not retrofittable into existing systems.

Therefore, it would be desirable to provide a system and method that cure one or more of the shortfalls of the previous approaches identified above.

SUMMARY

An inline vortex demister for removing moisture from an air stream is disclosed. In embodiments, the inline vortex demister includes one or more vortex-inducing structures disposed within a tube. In embodiments, the one or more vortex-inducing structures are configured to induce an air stream with a first moisture content into a vortex flow pattern in order to remove a first volume of moisture from the air stream by causing the first volume of moisture to adsorb to an inner tube surface of the tube. In additional embodiments, the inline vortex demister includes a demister element disposed within the tube, wherein the demister element is configured to remove a second volume of moisture from the air stream.

An inline vortex demister for removing moisture from an air stream is disclosed. In embodiments, the inline vortex demister includes an air vent tube configured to receive an air stream with a first moisture content from an aircraft storage tank. In additional embodiments, the inline vortex demister includes one or more vortex-inducing structures disposed within the air vent tube, wherein the one or more vortex-inducing structures are configured to induce the air stream into a vortex flow pattern in order to remove a first volume of moisture from the air stream. In further embodiments, the inline vortex demister includes a demister element disposed within the air vent tube, wherein the demister element is configured to remove a second volume of moisture from the air stream. In embodiments, the air vent tube is configured to return the first volume of moisture and the second volume of moisture to the aircraft storage tank.

A method for removing moisture from an air stream is disclosed. In embodiments, the method includes: directing an air stream through a tube; inducing the air stream into a vortex flow pattern with one or more vortex-inducing structures disposed within the tube; removing a first volume of moisture from the air stream by adsorbing at least a portion of the first volume of moisture to an inner tube surface of the tube; and removing a second volume of moisture from the air stream with a demister element disposed within the tube.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
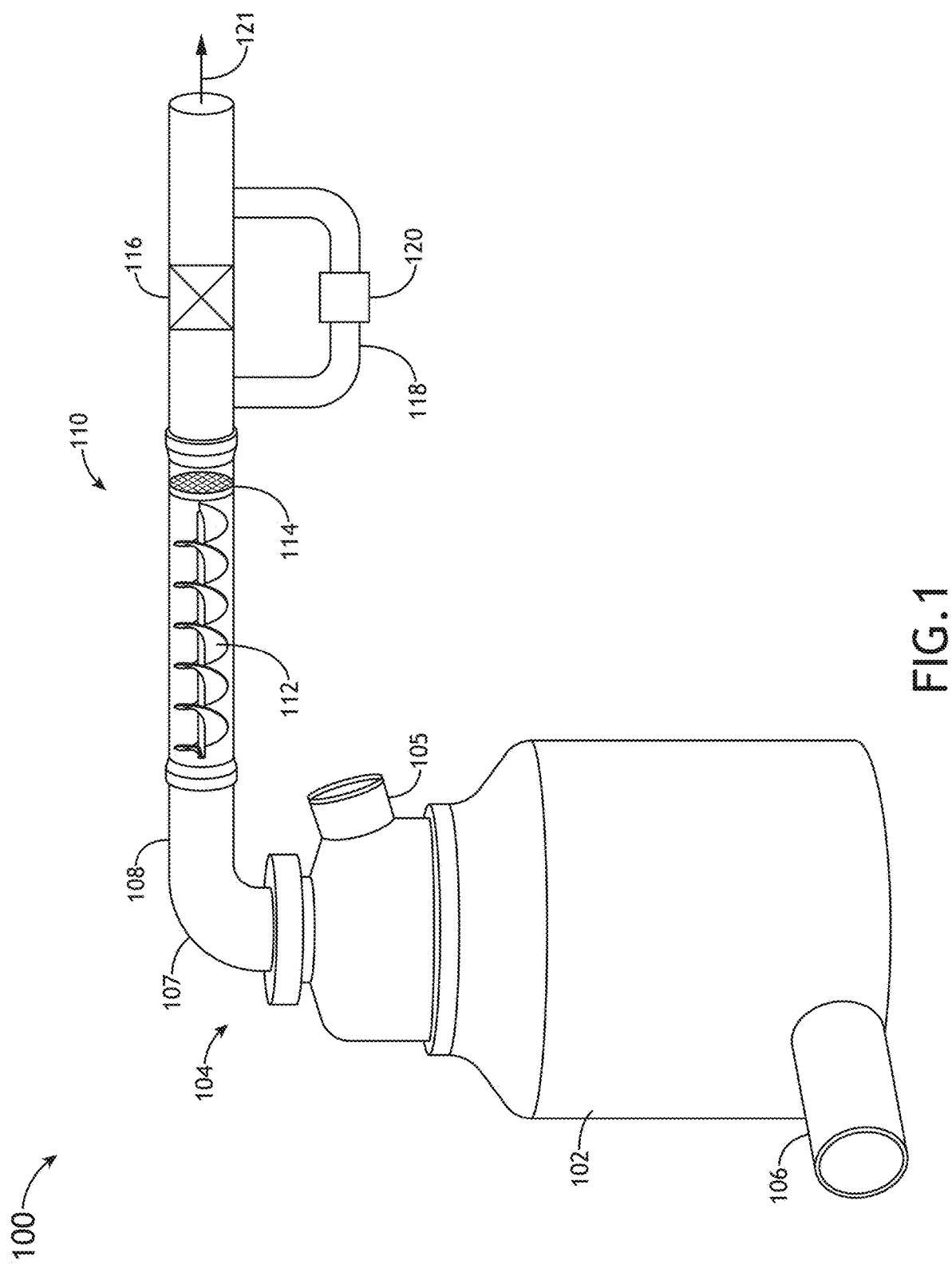
FIG. 1 illustrates an aircraft waste material separation system including an inline vortex demister, in accordance with an example embodiment of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, directional terms such as "top," "bottom," "over," "under," "upper," "upward," "lower," "down," "downward," and similar terms, are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Additionally, as used herein, a letter following a reference numeral is intended to reference an embodiment of the feature or element that may be similar, but not necessarily identical, to a previously described element or feature bearing the same reference numeral (e.g., 1, 1A, 1B). Such shorthand notations are used for purposes of convenience only, and should not be construed to limit the inventive concepts disclosed herein in any way unless expressly stated to the contrary.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the present disclosure are directed to an inline vortex demister configured to remove moisture from an air stream. Some embodiments may utilize one or more vortex-inducing structures disposed within a tube configured to induce the air stream into a vortex flow pattern in order to increase contact between the air stream and an inner tube surface of the tube. By increasing contact between the air stream and the inner tube surface of the tube, the vortex-inducing structures may cause moisture to adhere to the inner tube surface of the tube, thereby removing a first volume of moisture from the air stream. Additional embodiments of the present disclosure are directed to the use of a demister element configured to remove a second volume of moisture from the air stream. Furthermore, some embodiments of the present disclosure are directed to a tube configured to direct a dried air stream out of an aircraft, wherein the tube is further configured to return the first volume of moisture and the second volume of moisture removed from the air stream back to an aircraft storage tank.

Referring generally to FIGS. 1-7, a system and method for removing moisture from an air stream is described, in accordance with example embodiments of the present disclosure.

FIG. 1 illustrates an aircraft waste material separation system 100 including an inline vortex demister 110, in accordance with an example embodiment of the present disclosure. The system 100 may include, but is not limited to, an aircraft storage tank 102, a vortex separator 104, an air vent tube 108, an inline vortex demister 110, a bypass flow regulator 116, and a vacuum generator 120.

In embodiments, the aircraft waste material separation system 100 may be disposed within an aircraft. An inlet tube 105 of aircraft waste material separation system 100 is configured to receive waste materials from aircraft toilets or other receptacles, and direct the waste materials to the aircraft storage tank 102. The inlet tube 105 therefore receives waste streams which may include, but are not limited to, waste water, waste solids, air, and other materials from aircraft toilets when they are flushed. Waste materials are then collected and stored in the aircraft storage tank 102 ("storage tank 102"). In embodiments, the vacuum generator 120 may be configured to generate a suction force within the air vent tube 108 in order to draw waste materials from toilets or other receptacles into the storage tank, and further configured to draw an air stream 111 through the air vent tube 108 and inline vortex demister 110.

In some embodiments, storage tank 102 includes a drain tube 106. The drain tube 106 may be coupled to the storage tank 102 at or near the bottom of the storage tank 102, and may be configured to couple the storage tank 102 to a waste removal system in order to remove waste from the storage tank 102 during servicing of the aircraft.

As noted previously herein, the air drawn into the storage tank 102 along with waste materials must be vented and released out to the atmosphere in order to prevent the build-up of air and other gasses within the storage tank 102. The air stream 111 from the storage tank 102 must be cleaned/filtered such that it is free of solid waste and particulate matter, for obvious health and safety concerns. Additionally, any moisture within the air stream 111 released from the aircraft may condense on the exterior of the aircraft, which may clog the air vent tube 108 or interfere with the operation of the aircraft. In this regard, the air stream 111 from the storage tank must be filtered and dried such that the dried air stream 121 released out of the aircraft includes a sufficiently low moisture content. In embodiments, a vortex separator 104 is configured to filter solid waste, particulate matter, and moisture from the air stream 111. In this regard, the vortex separator 104 is configured to receive air from the storage tank 102 and filter the air such that the air stream 111 directed through an exhaust cap 107 and air vent tube 108 is, ideally, substantially free of solid waste, particulate matter, and moisture.

A more detailed description of the integrated vortex separator (e.g., vortex separator 104) is provided by Yen Chuh, Thao Hoang, and Kristin R. Noriega in U.S. patent application Ser. No. 16/280,623, entitled INTEGRATED VORTEX SEPARATOR, filed on Feb. 20, 2019, which is incorporated herein by reference in the entirety. Additionally, a more detailed description of the bypass flow regulator is provided by Yen Chuh, Thao Hoang, and Kristin R. Noriega in U.S. patent application Ser. No. 16/280,761, entitled BYPASS FLOW REGULATOR, filed on Feb. 20, 2019, which is incorporated herein by reference in the entirety.

In embodiments, an inline vortex demister 110 may be disposed within the air vent tube 108. The inline vortex demister 110 may be configured to further remove moisture from the air stream 111 to generate a dried air stream 121. In this regard, inline vortex demister 110 may be configured to receive air stream 111 with a first moisture content, and generate a dried air stream 121 with a second moisture content, wherein the second moisture content is lower than the first moisture content. Air vent tube 108 may then be configured to direct the dried air stream 121 and expel dried air stream 121 from the aircraft. It is noted herein that the use of inline vortex demister 110 may be used to filter moisture from the air stream 111 to ensure air expelled from the aircraft (e.g., dried air stream 121) has a sufficiently low moisture content to prevent condensation and freezing of moisture on the exterior of the aircraft. Additionally, inline vortex demister 110 may provide improved moisture-removing performance such that the size, complexity, and/or weight of the vortex separator 104 may be reduced without affecting the moisture content of the dried air stream 121 expelled from the aircraft.

In some embodiments, the inline vortex demister 110 includes one or more vortex-inducing structures 112 and a demister element 114. In embodiments, the inline vortex demister 110 (e.g., one or more vortex-inducing structures 112, demister element 114) are disposed within the air vent tube 108. It is contemplated herein that providing additional moisture-removal capabilities within the air vent tube 108 the inline vortex demister 110 of the present disclosure to be incorporated into a wide variety of aircraft and/or other material separation systems. In this regard, it is contemplated herein that the inline vortex demister 110 may be incorporated into new aircraft waste material separation systems (e.g., system 100) and/or may be retrofitted into existing aircraft systems with deficient moisture removal capabilities. In current systems, plumbing space after the storage tank 102 is not utilized for moisture separation, but only air exhaust. Because the inline vortex demister 110 is disposed within a section of tube (e.g., air vent tube 108), retrofitting the inline vortex demister 110 into an existing system may simply include replacing a portion of existing standard plumbing tubing with a portion of tubing including the inline vortex demister 110. Thus, the inline vortex demister 110 may comprise a "drop-in" or "kit" solution for optimizing and improving traditional waste material separation systems. Furthermore, it is contemplated herein that the addition of the inline vortex demister 110 may provide for improved moisture-removing performance without substantially increasing the overall weight of the aircraft.

Figure 2A:
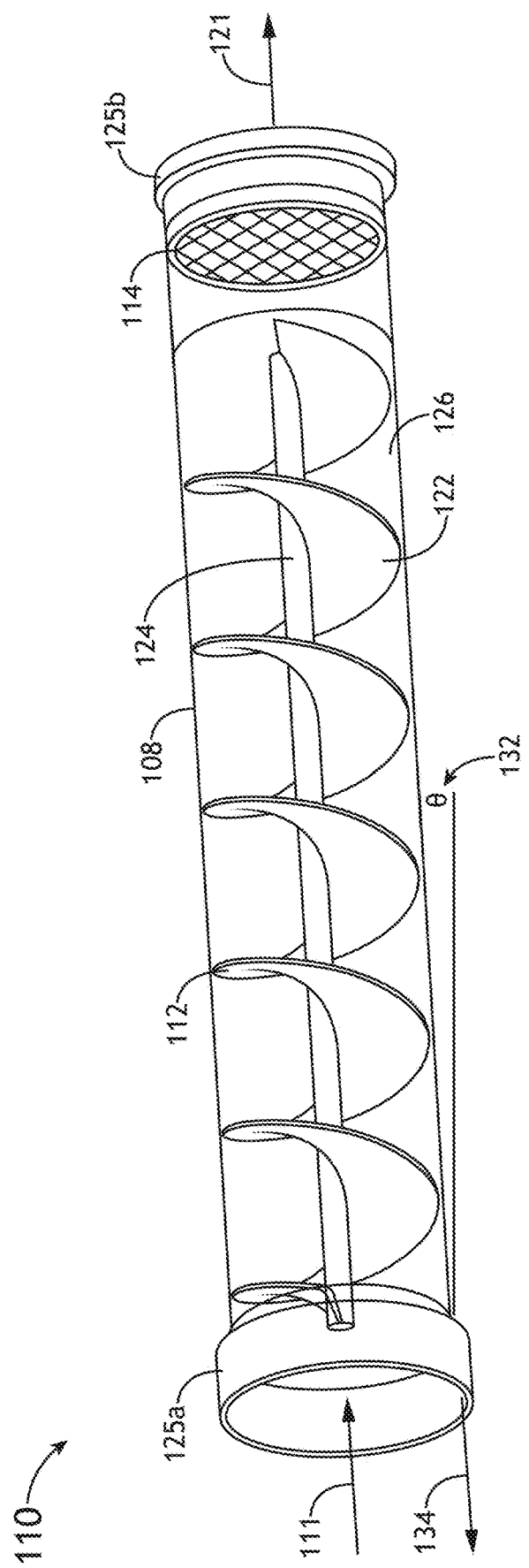
FIG. 2A illustrates a perspective view of an inline vortex demister, in accordance with an example embodiment of the present disclosure.
Figure 2B:
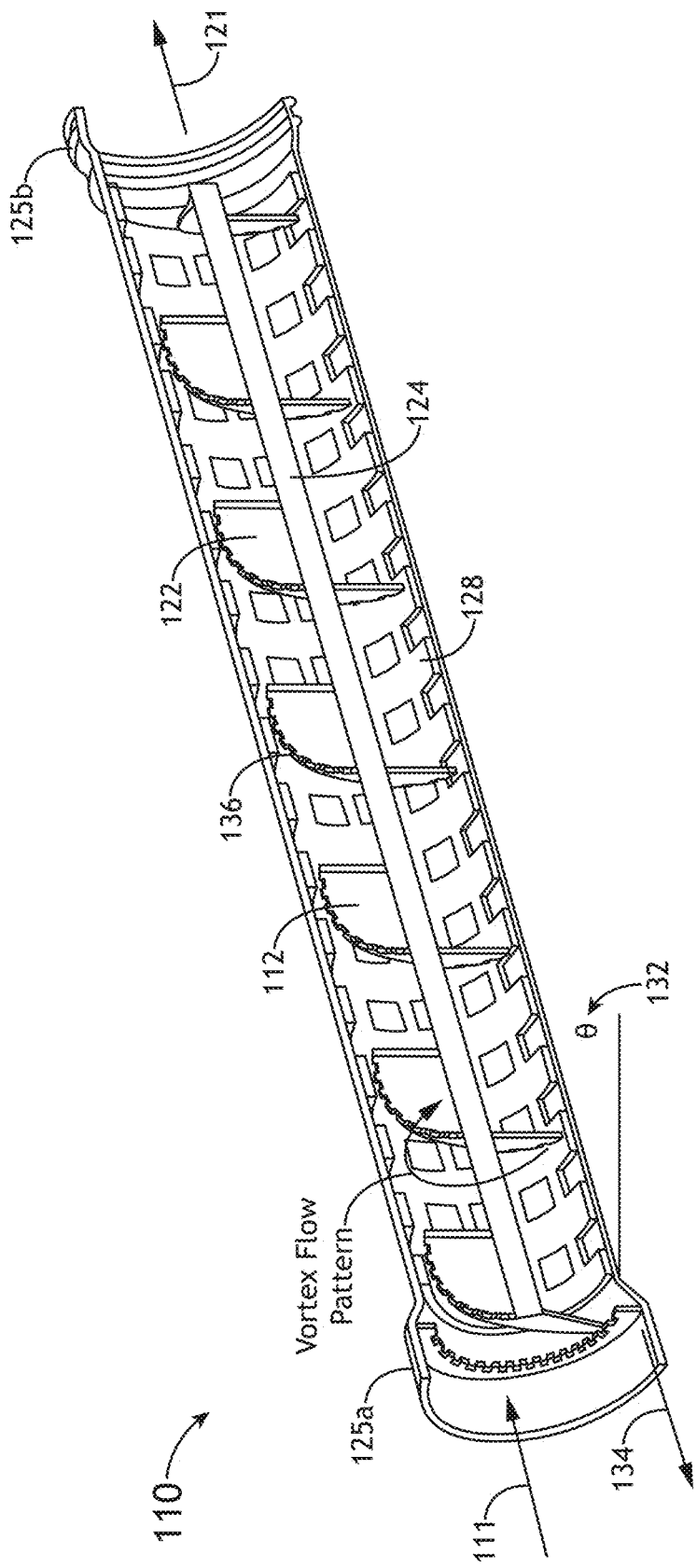
FIG. 2B illustrates a cross-sectional view of an inline vortex demister, in accordance with an example embodiment of the present disclosure.
Figure 2C:
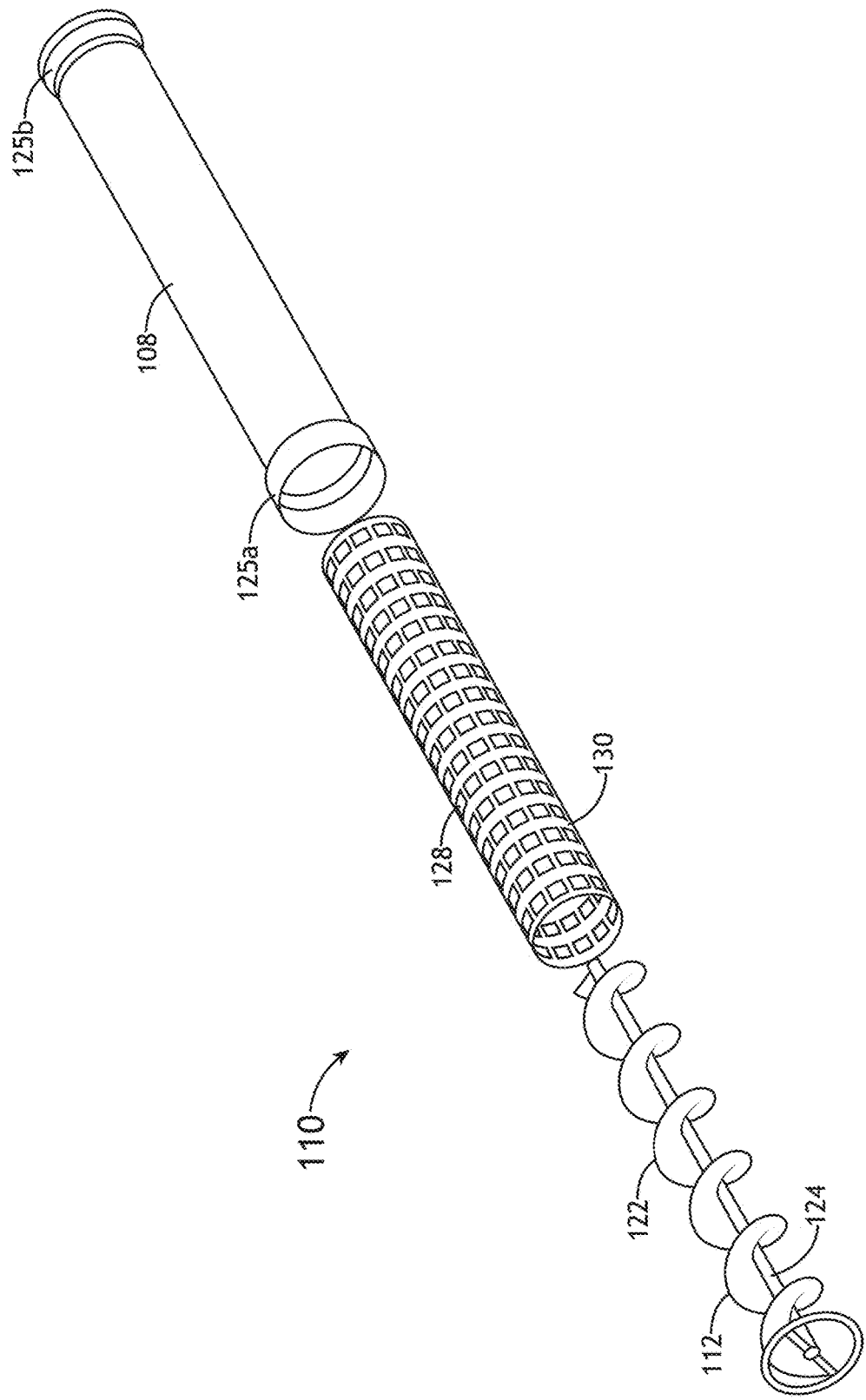
FIG. 2C illustrates an exploded view of an inline vortex demister, in accordance with an example embodiment of the present disclosure.

FIG. 2A illustrates a perspective view of an inline vortex demister 110, in accordance with an example embodiment of the present disclosure. FIG. 2B illustrates a cross-sectional view of an inline vortex demister 110, in accordance with an example embodiment of the present disclosure. FIG. 2C illustrates an exploded view of an inline vortex demister 110, in accordance with an example embodiment of the present disclosure. As noted previously herein, the inline vortex demister 110 may include, but is not limited to, one or more vortex-inducing structures 112 and a demister element 114.

As shown in FIG. 2B, the inline vortex demister 110 may be configured to receive an air stream 111. For example, as shown in FIG. 1, the air vent tube 108 may direct an air stream 111 from the storage tank 102 and exhaust cap 107 to the inline vortex demister 110. As noted previously, the air stream 111 received from the aircraft storage tank 102 may include a moisture content. In embodiments, the air vent tube 108 includes a cylindrical air vent tube. However, it is noted herein that the air vent tube 108 may take any shape known in the art without departing from the spirit or scope of the present disclosure. For example, the air vent tube 108 may additionally and/or alternatively include a tube/duct with varying cross sections including, but not limited to, a square, a rectangle, an oval, and the like.

In embodiments, inline vortex demister 110 includes a first fitting 125a disposed at a first end of the inline vortex demister 110, and a second fitting 125b disposed at a second end of the inline vortex demister 110. The first fitting 125a and the second fitting 125b may be configured to couple the inline vortex demister 110 to additional pipes, tubes, or the like. In this regard, it is contemplated herein that the inline vortex demister 110 may be easily fit to standard plumbing pipe and efficiently "dropped in"/retrofitted into an existing aircraft waste material separation system in order to improve moisture separation performance.

In embodiments, the inline vortex demister 110 includes one or more vortex-inducing structures 112. The one or more vortex-inducing structures 112 may be configured to induce the air stream 111 into a vortex flow pattern. In this regard, the one or more vortex-inducing structures 112 may include any structures known in the art for inducing the air stream 111 into a vortex flow pattern. For example, as shown in FIGS. 2A-2C, the one or more vortex-inducing structures 112 may include a helical structure 122. The helical structure 122 may be arranged about a shaft 124, wherein the shaft 124 is aligned along a central axis of the air vent tube 108.

The one or more vortex-inducing structures 112 may be configured to induce the air stream 111 into a vortex flow pattern in order to increase contact between the air within the air stream 111 and an inner tube surface 126 of the air vent tube 108. By increasing inducing a vortex flow pattern and increasing the amount of contact surface area between the inner tube surface 126 of the air vent tube 108 and the air stream 111, the one or more vortex-inducing structures 112 may be configured to increase friction between the air stream 111 and the inner tube surface 126, thereby slowing the air stream 111. In embodiments, the one or more vortex-inducing structures 112 may increase contact between the air stream 111 and the inner tube surface 126 of the air vent tube 108 sufficiently such that moisture within the air stream 111 adsorbs to the inner tube surface 126. Accordingly, the one or more vortex-inducing structures 112 may be configured to induce a vortex flow pattern in order to separate a volume of moisture from the air stream 111. While it is contemplated herein that some of the moisture removed from the air stream 111 will be adsorbed to the inner tube surface 126 of the air vent tube 108, it is further contemplated herein that at least a portion of the moisture removed from the air stream 111 by the one or more vortex-inducing structures 112 may be adsorbed to a surface of the one or more vortex-inducing structures 112.

For example, an air stream 111 with a moisture content may be directed through the air vent tube 108 to the inline vortex demister 110. A helical structure 122 disposed about a shaft 124 may induce the air stream 111 into a vortex flow pattern corresponding to the helical shape of the helical structure 122. By inducing the air stream 111 into a vortex flow pattern, the helical structure 122 may be configured to increase contact and friction between the air stream 111 and the inner tube surface 126 of the air vent tube 108, thereby allowing a first volume of moisture to be adsorbed to the inner tube surface 126 and separated from the air stream 111.

In some embodiments, the inner tube surface 126 may be formed from, or may be coated with, a textured and/or hydrophilic material in order to facilitate moisture removal from the air stream 111.

In embodiments, inline vortex demister 110 may include a cylindrical grating 128. The cylindrical grating 128 may be disposed in the air vent tube 108 and configured to collect water droplets (e.g., moisture) removed from the air stream 111. The cylindrical grating 128 may include any structure known in the art including, but not limited to, a mesh structure. As shown in FIGS. 2B and 2C, the cylindrical grating 128 may be substantially cylindrical in shape such that the cylindrical grating 128 is disposed adjacent to the inner tube surface 126 of the air vent tube 108. Additionally, the cylindrical grating 128 may be shaped such that an outer edge of the helical structure 122 is positioned adjacent to the cylindrical grating 128. It is noted herein that the cylindrical grating 128 may be configured to increase the contact surface area between the air stream 111 and the inner tube surface 126 and/or cylindrical grating 128. Additionally, the cylindrical grating 128 may include a plurality of holes 130. In embodiments, the plurality of holes 130 within the cylindrical grating 128 may be configured to further separate moisture from the air stream 111 and collect water droplets as moisture is adsorbed to the inner tube surface 126. Furthermore, it is contemplated herein that a grating structure similar to the cylindrical grating 128 may be wrapped around the helical structure 122 in order to facilitate moisture removal.

In some embodiments, the inline vortex demister 110 is configured to return moisture separated from the air stream 111 to the storage tank 102. For example, as shown in FIG. 2B, the air vent tube 108 (and therefore the inline vortex demister 110) may be arranged along an inclined plane defined by an incline angle 132. In this example, gravity may act on the moisture adsorbed to the inner tube surface 126 (or a surface of the one or more vortex-inducing structures 112, the cylindrical grating 128, and the like) and separated from the air stream 111 such that the collected moisture is "pulled" down the air vent tube 108 along the inclined plane as a collected moisture stream 134. The air vent tube 108 may then be configured to direct the collected moisture stream 134 back to the storage tank 102.

In some embodiments, the one or more vortex-inducing structures 112 may include one or more cut-outs 136 configured to receive at least a portion of the collected moisture stream 134 and allow the collected moisture stream 134 to pass through the air vent tube 108 back to the storage tank 102. For example, as shown in FIG. 2B, the helical structure 122 (e.g., vortex-inducing structures 112) may include a plurality of cut-outs 136 along an outer edge of the helical structure 122. The plurality of cut-outs 136 may be arranged at varying locations along the outer edge of the helical structure 122 such that collected moisture may travel "down" the air vent tube 108 at any location along the inner tube surface 126.

It is noted herein that the majority of the collected moisture stream 134 may travel down the air vent tube 108 along the "bottom" of the inner tube surface 126 of the air vent tube 108. Accordingly, in additional and/or alternative embodiments, the one or more cut-outs 136 may be disposed along the outer edge of the helical structure 122 only at specified locations. For example, in embodiments in which the helical structure 122 (e.g., vortex-inducing structures 112) are fixed within the air vent tube 108, the one or more cut-outs 136 may be disposed along the outer edge of the helical structure 122 proximate to points corresponding to the "bottom" of the air vent tube 108. By positioning the one or more cut-outs 136 along the outer edge of the helical structure 122 at points which correspond to the bottom of the air vent tube 108, the one or more cut-outs 136 may allow for the passage of the collected moisture stream 134 while decreasing disruptions introduced into the vortex flow pattern induced by the one or more vortex-inducing structures 112.

Figure 3:
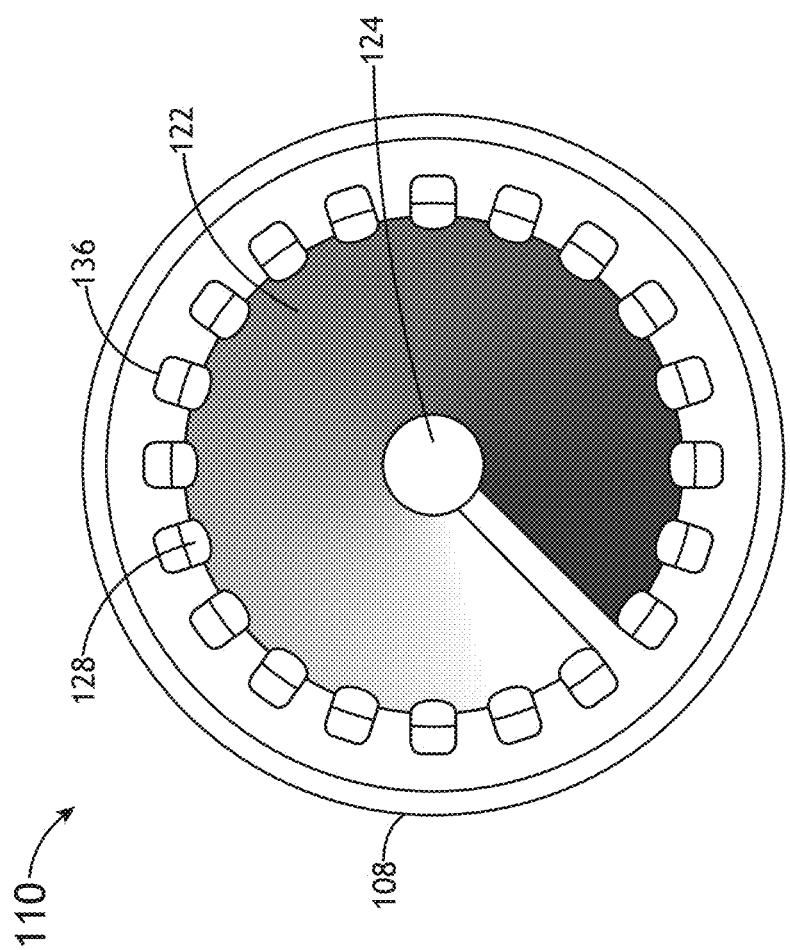
FIG. 3 illustrates a front elevation view of an inline vortex demister, in accordance with an example embodiment of the present disclosure.

FIG. 3 illustrates a front elevation view of an inline vortex demister 110, in accordance with an example embodiment of the present disclosure. As can be seen in FIG. 3, the helical structure 122 may include one or more cut-outs 136 configured to allow for the passage of the collected moisture stream 134 down the air vent tube 108.

Figure 4:
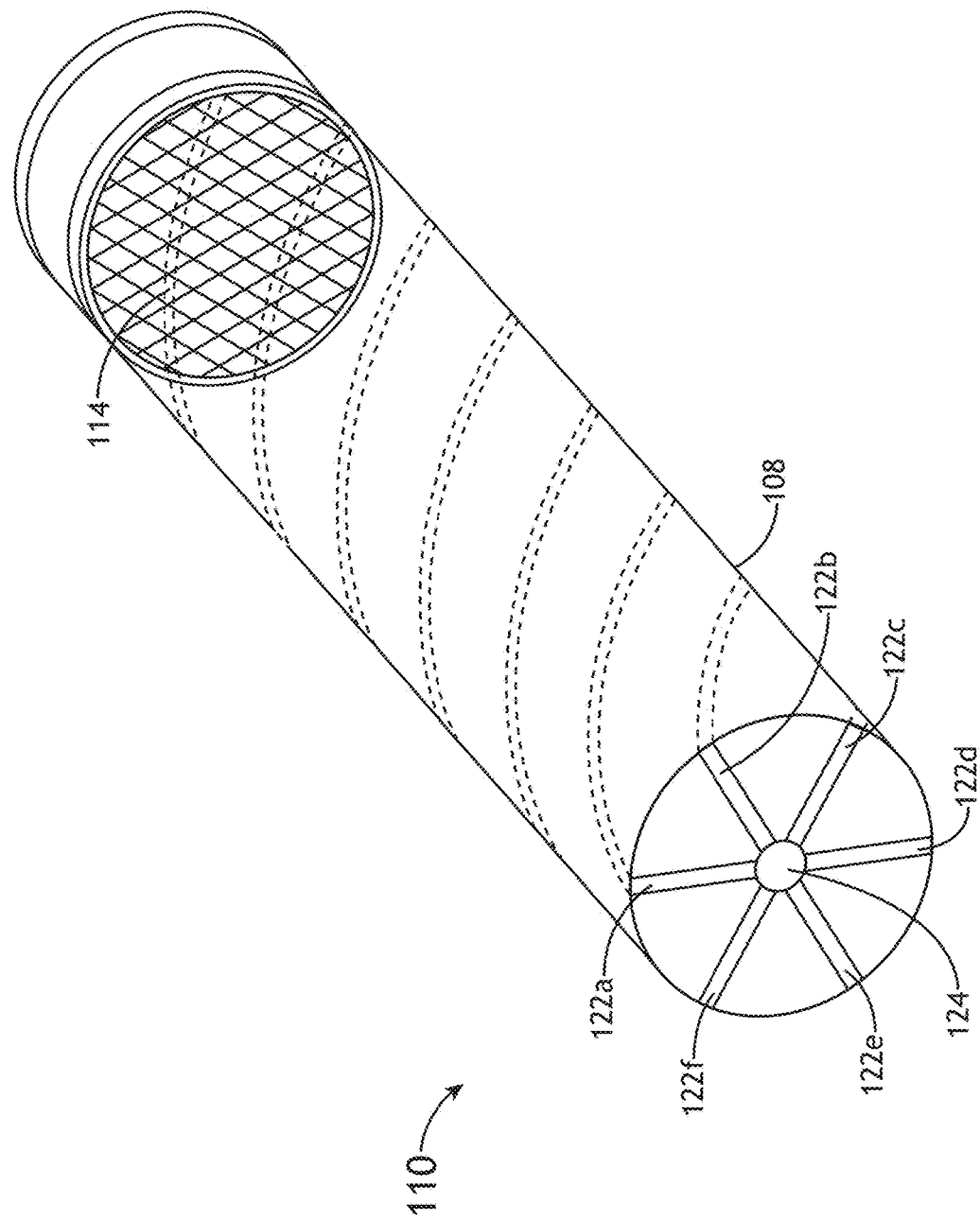
FIG. 4 illustrates a perspective view of an inline vortex demister, in accordance with an example embodiment of the present disclosure.

FIG. 4 illustrates a perspective view of an inline vortex demister 110, in accordance with an example embodiment of the present disclosure.

As noted previously herein, the one or more vortex-inducing structures 112 may include any structures known in the art configured to induce the air stream 111 into a vortex flow pattern. For example, as shown in FIG. 4, the one or more vortex-inducing structures 112 may include a plurality of helical structures 122, including a first helical structure 122a, a second helical structure 122b, a third helical structure 122c, a fourth helical structure 122d, and a fifth helical structure 122e, and a sixth helical structure 122f. As compared to the inline vortex demister 110 depicted in FIG. 2A, which includes a single helical structure 122 disposed about a shaft 124, the inline vortex demister 110 depicted in FIG. 4 may include a plurality of helical structures 122a, 122b, 122c, 122d, 122e, 122f disposed about a shaft 124. In this regard, the one or more vortex-inducing structures may include any number of helical structures 122. It is noted herein that any discussion associated with the helical structure 122 depicted in FIGS. 2A-3 may be regarded as applying to the helical structures 122a, 122b, 122c, 122d, 122e, 122f depicted in FIG. 4, unless noted otherwise herein.

Figure 5:
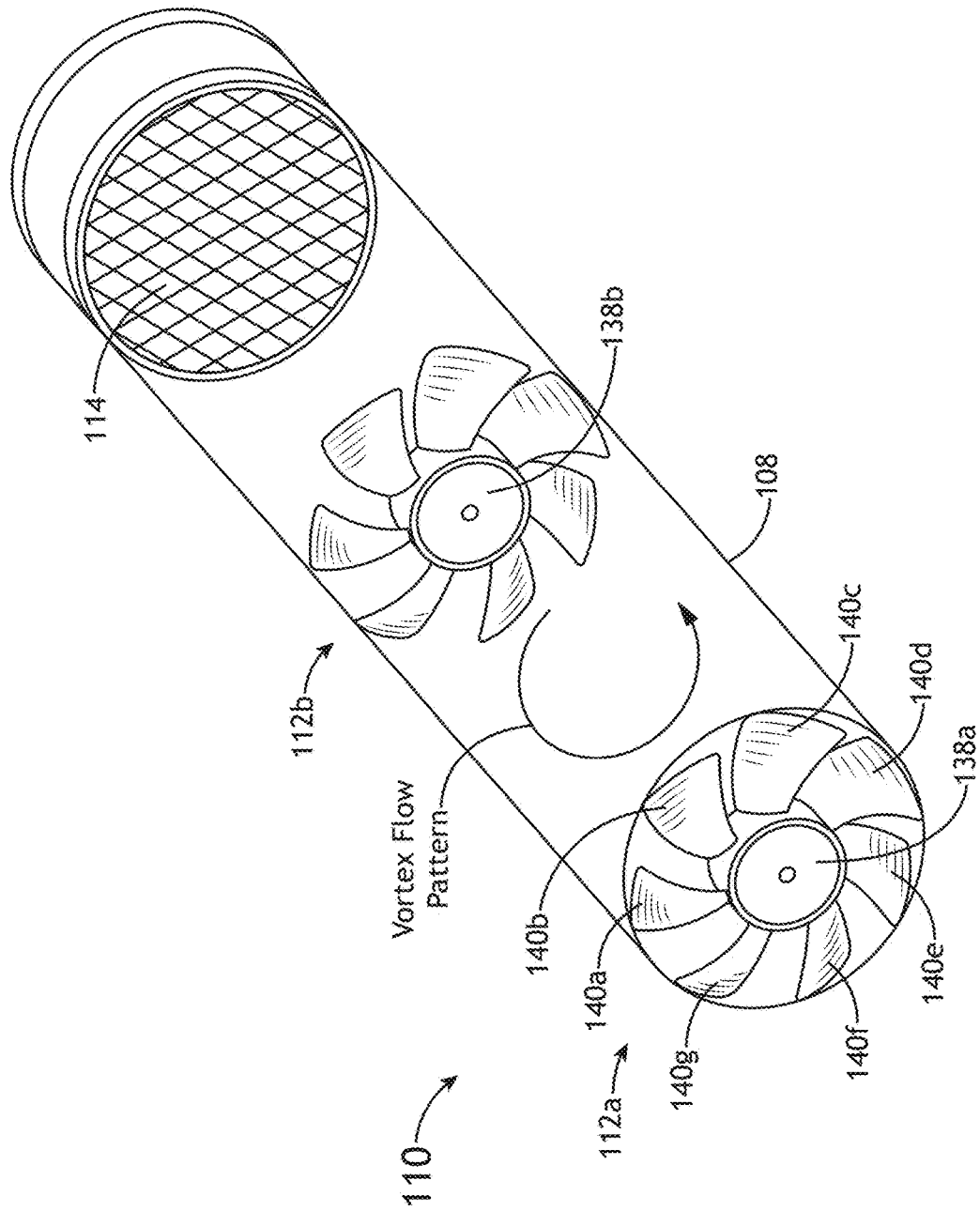
FIG. 5 illustrates a perspective view of an inline vortex demister, in accordance with an example embodiment of the present disclosure.

FIG. 5 illustrates a perspective view of an inline vortex demister 110, in accordance with an example embodiment of the present disclosure. In particular, FIG. 5 illustrates an inline vortex demister 110 in which the one or more vortex-inducing structures 112 include a first vane assembly 138a and a second vane assembly 138b. In embodiments, each of the first vane assembly 138a and the second vane assembly 138 include a plurality of angled vanes 140a-140g. The vane assemblies 138 may be fixedly coupled to the inner tube surface 126 of the air vent tube 108 at one or more outer edges of the angled vanes 140. In embodiments, the angled vanes 140 of the vane assemblies 138 may be configured to induce the air stream 111 into a vortex flow pattern. It is contemplated herein that any number of vane assemblies 138 and/or angled vanes 140 may be used to induce the air stream 111 into a vortex flow pattern.

As noted previously herein, the one or more vortex-inducing structures 112 may include any structures known in the art configured to induce the air stream 111 into a vortex flow pattern. For example, the one or more vortex-inducing structures 112 may include, but are not limited to, one or more helical structures 122, one or more vane assemblies 138, one or more angled vanes 140, and the like. By way of another example, the one or more vortex-inducing structures 112 may include one or more angled fins projecting out from the inner tube surface 126 of the air vent tube 108.

Figure 6:
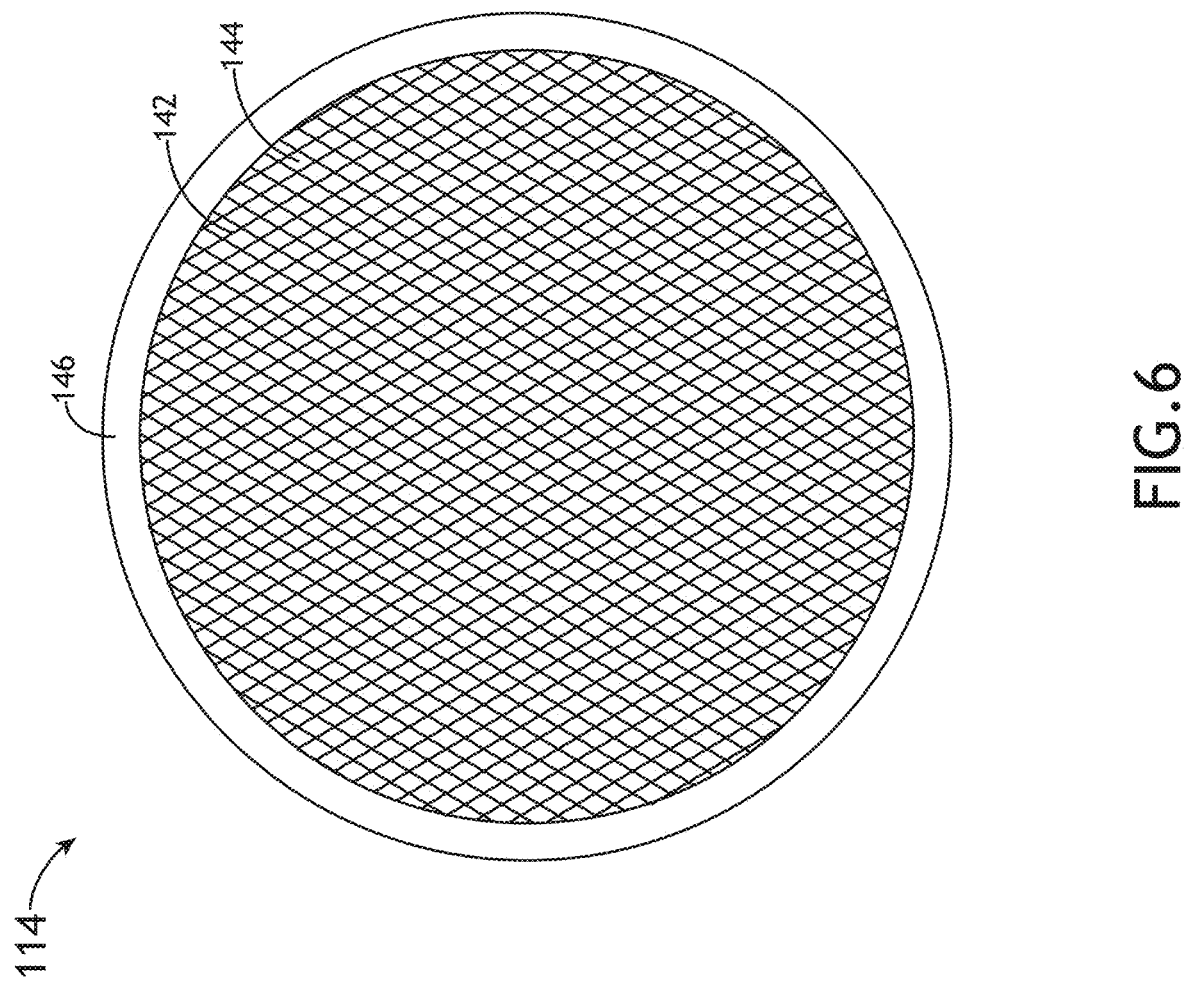
FIG. 6 illustrates a front elevation view of a demister element, in accordance with an example embodiment of the present disclosure.

FIG. 6 illustrates a front elevation view of a demister element 114, in accordance with an example embodiment of the present disclosure.

In embodiments, demister element 114 is configured to remove a volume of moisture from the air stream 111. In some embodiments, the demister element 114 may be configured to remove a volume of moisture from the air stream 111 following the removal of moisture by the one or more vortex-inducing structures 112. For example, the one or more vortex-inducing structures 112 may be configured to induce the air stream 111 into a vortex flow pattern in order to remove a first volume of moisture from the air stream 111. The demisting element 114 may then be configured to remove a second volume of moisture from the air stream 111. As noted previously herein, the air vent tube 108 may be configured to return collected moisture (e.g., the first volume of moisture and the second volume of moisture) back to the storage tank 102 as the collected moisture stream 134.

It is noted herein that the demister element(s) 114 may include any demister element(s) known in the art for removing a volume of moisture from an air stream. For example, the demister element 114 may include, but is not limited to, a wire mesh. For instance, as shown in FIG. 6, the demister element 114 may include a wire mesh formed by a plurality of wire filaments 142. The wire mesh may further include an outer bezel 144 configured to couple the plurality of wire filaments 142, and further configured to couple the demister element 114 to the inner tube surface 126 of the air vent tube 108. The plurality of wire filaments 142 may be configured to form a lattice/mesh structure with a plurality of spaces 146. In this regard, moisture within the air stream 111 may adhere to the plurality of wire filaments 142, while dry air within the air stream 111 is passed through the plurality of spaces 146 to form the dried air stream 121. It is contemplated herein that the plurality of wire filaments 142 of the wire mesh (e.g., demister element 114) may be arranged such that the size of the plurality of spaces 146 is smaller than the particle size of moisture droplets in the air stream 111, thereby causing moisture droplets to adhere to the wire filaments 142 of the wire mesh. As moisture droplets adhere to the wire mesh, the droplets may merge together, forming larger moisture droplets which may drop from the demister element 114 and form a portion of the collected moisture stream 134 which is returned to the storage tank 102. It is contemplated herein that the use of both vortex-inducing structures 112 and the demister element 114 may provide for moisture removal at the near-molecular level.

In embodiments, the demister element 114 (e.g., wire mesh) may include and/or be formed by a material with hydrophobic or hydrophilic properties. For example, the plurality of wire filaments 142 may be coated with a hydrophilic material. By way of another example, the plurality of wire filaments 142 may be formed from a hydrophobic material. It is contemplated herein that the use of hydrophobic or hydrophilic materials within the demister element 114 may facilitate the removal of moisture from the air stream 111.

Figure 7:
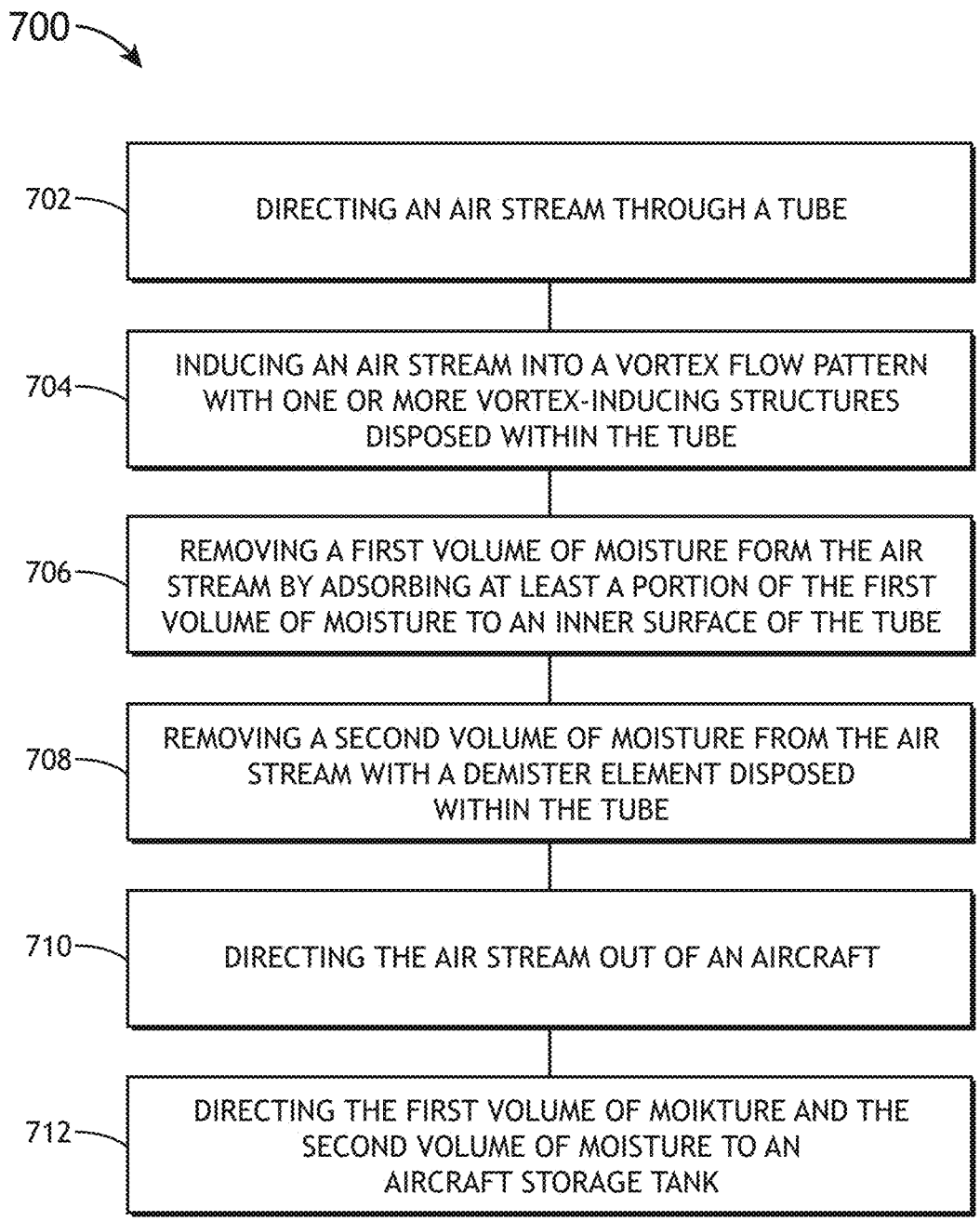
FIG. 7 illustrates a flowchart of a method for removing moisture from an air stream, in accordance with an example embodiment of the present disclosure.

FIG. 7 illustrates a flowchart of a method 700 for removing moisture from an air stream 111, in accordance with an example embodiment of the present disclosure.

In a step 702, an air stream is directed through a tube. For example, as shown in FIG. 2B, the air stream 111 including a moisture content may be directed from an aircraft storage tank 102 through an air vent tube 108.

In a step 704, the air stream is induced into a vortex flow pattern with one or more vortex-inducing structures disposed within the tube. The one or more vortex-inducing structures 112 may include any structures known in the art configured to induce an air stream 111 into a vortex-flow pattern including, but not limited to, one or more helical structures 112, one or more vane assemblies 138, one or more angled vanes 140, one or more angled fins, and the like.

In a step 706, a first volume of moisture is removed form the air stream by adsorbing at least a portion of the first volume of moisture to an inner tube surface of the tube. As noted previously herein, inducing the air stream 111 into a vortex flow pattern with the one or more vortex-inducing structures 112 may cause increase contact and friction between the air stream 111 and the inner tube surface 126 of the air vent tube 108, thereby allowing a first volume of moisture to be adsorbed to the inner tube surface 126 and separated from the air stream 111. It is further noted herein that at least a portion of the first volume of moisture may be removed from the air stream 111 by adsorbing to a surface of the one or more vortex-inducing structures 112 and/or the cylindrical grating 128.

In a step 708, a second volume of moisture is removed from the air stream with a demister element disposed within the tube. For example, as shown in FIG. 2B, a demister element 114 may be disposed within the air vent tube 108. The demister element 114 may include any demister element known in the art including, but not limited to, a wire mesh. Furthermore, the demister element 114 may be formed and/or coated with a material with hydrophobic or hydrophilic properties in order to facilitate removal of moisture from the air stream 111.

In a step 710, the air stream is directed out of an aircraft. For example, as shown in FIG. 1, the dried air stream 121 is directed out of an aircraft. It is noted herein that the inline vortex demister 110 may be configured to receive an air stream 111 with a first moisture content, and generate a dried air stream 121 with a second moisture content, wherein the second moisture content is less than the first moisture content. In this regard, the inline vortex demister 110 may be configured to ensure a sufficiently low moisture content in the dried air stream 121 expelled from the aircraft in order to prevent condensation and freezing on the exterior of the aircraft.

In a step 712, the first volume of moisture and the second volume of moisture are directed back to an aircraft storage tank. For example, the first volume of moisture and the second volume of moisture removed from the air stream 111 by the inline vortex demister 110 may form a collected moisture stream 134. As shown in FIG. 2B, the air vent tube 108 may be arranged along an inclined plane defined by an incline angle 132. Gravity may act on the moisture adsorbed to the inner tube surface 126 (or a surface of the one or more vortex-inducing structures 112 or cylindrical grating 128) and separated from the air stream 111 such that the collected moisture is "pulled" down the air vent tube 108 along the inclined plane as a collected moisture stream 134. The air vent tube 108 may then be configured to direct the collected moisture stream 134 back to the storage tank 102.

It is noted herein that much of the present disclosure is directed to a system and method for removing moisture from an air stream 111 in the context of an aircraft waste material separation system 100. However, it is further noted herein that embodiments of the system and method disclosed herein may be employed in contexts other than an aircraft setting. In this regard, it is contemplated herein that embodiments of the present disclosure may be implemented into a wide variety of contexts in which it is desired to remove moisture from an air stream. For example, embodiments of the present disclosure may be used to remove moisture from air streams in residential settings, commercial settings, industrial/manufacturing settings, and the like.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An inline vortex demister for removing moisture from an air stream, comprising:
   one or more vortex-inducing structures disposed within a tube, wherein the one or more vortex-inducing structures are configured to induce an air stream with a first moisture content into a vortex flow pattern in order to remove a first volume of moisture from the air stream by causing the first volume of moisture to adsorb to an inner tube surface of the tube;
   a first cylindrical grating disposed within the tube, wherein the one or more vortex-inducing structures are disposed within the first cylindrical grating, wherein the first cylindrical grating is configured to remove at least a first portion of the first volume of moisture from the air stream; and
   a demister element disposed within the tube, wherein the demister element is configured to remove a second volume of moisture from the air stream,
   wherein the inner tube surface of the tube is coated with a hydrophilic material, wherein the one or more vortex-inducing structures comprise one or more helical structures,
wherein the one or more vortex-inducing structures comprise one or more angled vanes,
wherein the demister element comprises a wire mesh structure.

2. The inline vortex demister of claim 1, wherein the one or more vortex-inducing structures are configured to induce the air stream into a vortex flow pattern in order to increase contact between the air stream and the inner tube surface of the tube.

3. The inline vortex demister of claim 1, wherein at least one helical structure of the one or more helical structures include:
one or more cut-outs on an outer edge of the at least one helical structure configured to allow at least a portion of the first volume of moisture or the second volume of moisture to pass through.

4. The inline vortex demister of claim 1, wherein the tube comprises an air vent tube of an aircraft storage tank, wherein the tube is configured to receive the air stream from the aircraft storage tank.

5. The inline vortex demister of claim 1, wherein the tube is further configured to return the first volume of moisture and the second volume of moisture to an aircraft storage tank as a collected moisture stream.

6. The inline vortex demister of claim 5, wherein the tube is arranged along an inclined plane, wherein the tube is configured to use gravity to return the first volume of moisture and the second volume of moisture to the aircraft storage tank down the inclined plane.

7. The inline vortex demister of claim 1, wherein the tube is further configured to direct the air stream through the demister element and expel a dried air stream from an aircraft.

8. The inline vortex demister of claim 7, wherein the dried air stream expelled from the aircraft includes a second moisture content, wherein the second moisture content is less than the first moisture content.

9. The inline vortex demister of claim 1, wherein the wire mesh structure is formed from a metal.

10. The inline vortex demister of claim 1, wherein at least a portion of the demister element comprises at least one of a hydrophobic material or a hydrophilic material.

11. The inline vortex demister of claim 1, further comprising a vacuum generator disposed within the tube, wherein the vacuum generator is configured to generate a suction force within the tube in order to draw the air stream through at least one of the one or more vortex-inducing structures or the demister element.

12. A method for removing moisture from an air stream, comprising
directing an air stream through a tube;
inducing the air stream into a vortex flow pattern with one or more vortex-inducing structures disposed within the tube;
removing a first volume of moisture from the air stream by adsorbing the first volume of moisture to an inner tube surface of the tube;
removing at least a first portion of the first volume of moisture from the air stream using a first cylindrical grating disposed within the tube, wherein the one or more vortex-inducing structures are disposed within the first cylindrical grating; and
removing a second volume of moisture from the air stream with a demister element disposed within the tube,
wherein the inner tube surface of the tube is coated with a hydrophilic material,
wherein the one or more vortex-inducing structures comprise one or more helical structures,
wherein the one or more vortex-inducing structures comprise one or more angled vanes,
wherein the demister element comprises a wire mesh structure.

13. The method of claim 12, further comprising directing a dried air stream out of an aircraft.

14. The method of claim 12, further comprising:
directing at least a portion of at least one of the first volume of moisture or the second volume of moisture to an aircraft storage tank.

* * * * *